(12) United States Patent
Callard et al.

(10) Patent No.: US 9,473,600 B2
(45) Date of Patent: Oct. 18, 2016

(54) HIGHER LAYER COMPRESSION WITH LOWER LAYER SIGNALING

(71) Applicant: Huawei Technologies Co., Ltd., Shenzhen (CN)

(72) Inventors: Aaron James Callard, Ottawa (CA); Peiying Zhu, Kanata (CA); Hang Zhang, Nepean (CA); Petar Djukic, Ottawa (CA); Vipul Desai, Palatine, IL (US); Peter Ashwood-Smith, Gatineau (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 244 days.

(21) Appl. No.: 14/459,105

(22) Filed: Aug. 13, 2014

(65) Prior Publication Data

US 2015/0003471 A1 Jan. 1, 2015

Related U.S. Application Data

(62) Division of application No. 13/557,932, filed on Jul. 25, 2012, now Pat. No. 8,817,624.

(51) Int. Cl.
*H04J 3/16* (2006.01)
*H04L 29/08* (2006.01)
(Continued)

(52) U.S. Cl.
CPC ........... *H04L 69/321* (2013.01); *H04L 41/147* (2013.01); *H04L 47/323* (2013.01);
(Continued)

(58) Field of Classification Search
USPC .................. 370/509, 328, 469; 709/248, 247
See application file for complete search history.

(56) References Cited

U.S. PATENT DOCUMENTS 6,014,429 A     1/2000  Laporta et al.
6,631,136 B1 * 10/2003  Chowdhury ............ H04L 45/02
                                                    370/395.31
(Continued)

FOREIGN PATENT DOCUMENTS

CN        101932102 A     12/2010

OTHER PUBLICATIONS

"Third Generation Partnership Project," Technical Specification Group Radio Access Network; Evolved Universal Terrestrial Redio Access (E-UTRA); Radio Resource Control (RRC); Protocol Specification, (Release 10), 3GPP TS 36.331 v10.5.0, Mar. 2012, 302 pages.
International Search Report and Written Opinion received in Application No. PCT/CN2013/079536, mailed Oct. 24, 2013, 12 pages.

*Primary Examiner* — Duc C Ho
(74) *Attorney, Agent, or Firm* — Slater Matsil, LLP (57) ABSTRACT

Methods and devices for reducing traffic over a wireless link through the compression or suppression of high layer packets carrying predictable background data prior to transportation over a wireless link. The methods include intercepting application layer protocol packets carrying the predictable background data. In embodiments where the background data is periodic in nature, the high layer packets may be compressed into low-layer signaling indicators for communication over a low-layer control channel (e.g., an on off keying (OOK) channel). Alternatively, the high layer packets may be suppressed entirely (not transported over the wireless link) when a receiver side daemon is configured to autonomously replicate the periodic background nature according to a projected interval. In other embodiments, compression techniques may be used to reduce overhead attributable to non-periodic background data that is predictable in context.

22 Claims, 10 Drawing Sheets

(51) Int. Cl.

| | |
|---|---|
| *H04L 12/823* | (2013.01) |
| *H04L 12/24* | (2006.01) |
| *H04L 29/06* | (2006.01) |
| *H04W 24/00* | (2009.01) |
| *H04L 12/801* | (2013.01) |
| *H04W 28/06* | (2009.01) |

(52) U.S. Cl.
CPC ........... *H04L67/2819* (2013.01); *H04L 69/04* (2013.01); *H04L 69/168* (2013.01); *H04L 69/18* (2013.01); *H04L 69/322* (2013.01); *H04W 24/00* (2013.01); *H04L 47/14* (2013.01); *H04L 67/02* (2013.01); *H04W 28/06* (2013.01)

(56) References Cited

U.S. PATENT DOCUMENTS

| | | |
|---|---|---|
| 2004/0030790 A1 | 2/2004 | Le et al. |
| 2004/0077345 A1 | 4/2004 | Turner et al. |
| 2005/0074007 A1* | 4/2005 | Samuels ............... H04L 1/1887 370/392 |
| 2007/0195815 A1 | 8/2007 | Turner et al. |
| 2008/0101296 A1 | 5/2008 | Palin et al. |
| 2009/0168701 A1* | 7/2009 | White ................. H04L 12/5692 370/328 |
| 2011/0136533 A1 | 6/2011 | Senarath et al. |
| 2012/0092994 A1 | 4/2012 | Wang et al. |
| 2012/0120828 A1 | 5/2012 | Anderson et al. |
| 2013/0157661 A1 | 6/2013 | Bhaskaran et al. |

\* cited by examiner

HIGHER LAYER COMPRESSION WITH LOWER LAYER SIGNALING

This patent application is a divisional of U.S. Provisional application Ser. No. 13/557,932, filed on Jul. 25, 2012 and entitled "Higher Layer Compression with Lower Layer Signaling," which is hereby incorporated by reference herein as if reproduced in its entirety.

TECHNICAL FIELD

The present invention relates generally to wireless communications, and more particularly to a system and method for reducing the amount of traffic communicated over wireless links attributable to background information or predictable signaling.

BACKGROUND

Today's wireless devices allow users to run various data applications, such as internet browsers (Internet Explorer, Firefox, etc.), social media programs (e.g., Facebook, Twitter, etc.), email managers (e.g., Outlook, etc.), network programs (e.g., Skype, Instant Messenger, etc.), and other programs. Such programs often generate a considerable amount of background overhead that may generally be communicated over the wireless link using predictable messages (such as hello messages) containing predictable background data. For instance, a user equipment (UE) that is running a social media application (e.g., Facebook) may send occasional status messages to the service provider that confirm that the application is still running on the UE. This status information may allow the service provider to perform various tasks, such as alert other users that the instant user is available to chat. There are many other reasons that applications may communicate background overhead, including for (but not limited to) billing/accounting, control signaling, and validation purposes.

Oftentimes the predictable packets used to communicate this background overhead are repetitive in nature, and are sent periodically (or semi-periodically). For instance, a social media application may send a status/hello message every ten seconds to notify the server that the programming is still running. These predictable packets may be internet protocol (IP) packets (or another protocol, such as Ethernet) comprising upwards of forty bytes, and consequently the transportation of these predictable packets may consume significant amounts of bandwidth on the wireless connection. Additionally, a UE may be required to complete an initialization protocol (e.g., a control plane protocol) to achieve an appropriate level of synchronization prior to sending the background information over the wireless link. For instance, in 3rd Generation Partnership Project (3GPP) long term evolution (LTE) systems, a UE that is presently in an idle state (e.g., a radio resource connected (RRC) idle state) may need to transition into an active state (e.g., RRC_CONNECTED state) before sending predictable packets. In some instances, UEs in the active state (e.g., RRC_CONNECTED state) may be required to transition from a low-level synchronization sub-state (e.g., OUT_OF_SYNC) to a higher level synchronization sub-state (e.g., IN_SYNC state) before sending the predictable packet over the wireless link. Such transitions may require the communication of hundreds (or even thousands) of bytes of data over the wireless link, thereby substantially increasing the amount of resources consumed through communication of the background overhead.

For these and other reasons, the communication of background overhead related to data applications installed on wireless devices (e.g., UEs) may consume substantial amounts of bandwidth in wireless networks. Accordingly, techniques and systems for reducing the amount of bandwidth consumed by the communication of background information are desired.

SUMMARY

Example embodiments of the present invention which provide a system and method for reducing the bandwidth consumed by predictable messaging in wireless communication systems.

In an embodiment, a method is provided for reducing traffic over a wireless link. In this example, the method includes intercepting a predictable signaling packet intended for transmission over the wireless link, and subsequently classifying the predictable signaling packet to identify a generic message type. In some instances, the predictable signaling packet carries predictable background data corresponding to an application running on a wireless device. Pursuant to classifying the predictable signaling packet, the method further includes triggering replication of the predictable signaling packet on an opposite side of the wireless link.

In another embodiment, a method is provided for reducing traffic over a wireless link. In this example, the method includes recognizing a first instance of periodic signaling intended for transmission over the wireless link, instructing a daemon positioned on an opposite side of the wireless link to replicate future instances of periodic signaling at projected intervals, and thereafter, preventing an attempted transmission of a second instance of periodic signaling over the wireless link. In this embodiment, the daemon replicates the second instance of periodic signaling without being notified of the second instance of periodic signaling.

In yet another embodiment, a method is provided for compressing background data that is predictable in context. In this example, the method includes detecting a triggering message comprising the background data that is projected to elicit an attempted transportation of one or more triggered messages over a high-layer channel of a wireless link, establishing a low-layer channel on the wireless link, and communicating one or more low-layer signaling indications each of which corresponding to a compressed one of the one or more triggered messages. In this embodiment, the attempted transportation of the one or more triggered messages over the high-layer channel is prevented by intercepting the said triggered messages prior to physical layer processing on a transmitter side of the wireless link.

Other embodiments of this disclosure include apparatuses/devices for executing and/or facilitating the execution of one or multiple steps of the methods summarized above.

BRIEF DESCRIPTION OF THE DRAWINGS

For a more complete understanding of the present invention, and the advantages thereof, reference is now made to the following descriptions taken in conjunction with the accompanying drawing, in which.

DETAILED DESCRIPTION

The operating of the current example embodiments and the structure thereof are discussed in detail below. It should be appreciated, however, that the present invention provides many applicable inventive concepts that can be embodied in a wide variety of specific contexts. The specific embodiments discussed are merely illustrative of specific structures of the invention and ways to operate the invention, and do not limit the scope of the invention.

One solution for reducing network overhead attributable to background data is to compress predictable packets of a common type (e.g., hello packets sent by a specific data application) into a periodic signaling indicator (e.g., a specific time frequency resource mapped to the type of compressed predictable signaling packet). Specifically, an application on the transmitter side (e.g., a transmitter side daemon) may intercept predictable signaling packets intended for transmission over the wireless link, compress the data into a low layer signaling indicator, and communicate the indicator to an application on the receiver side (e.g., a receiver side daemon). Upon detecting the signaling indicator, the receiver side daemon may replicate the predictable signaling packet, and forward the replicated predictable packet to an appropriate destination (e.g., an application server, or an application module on the wireless device).

Figure 1:
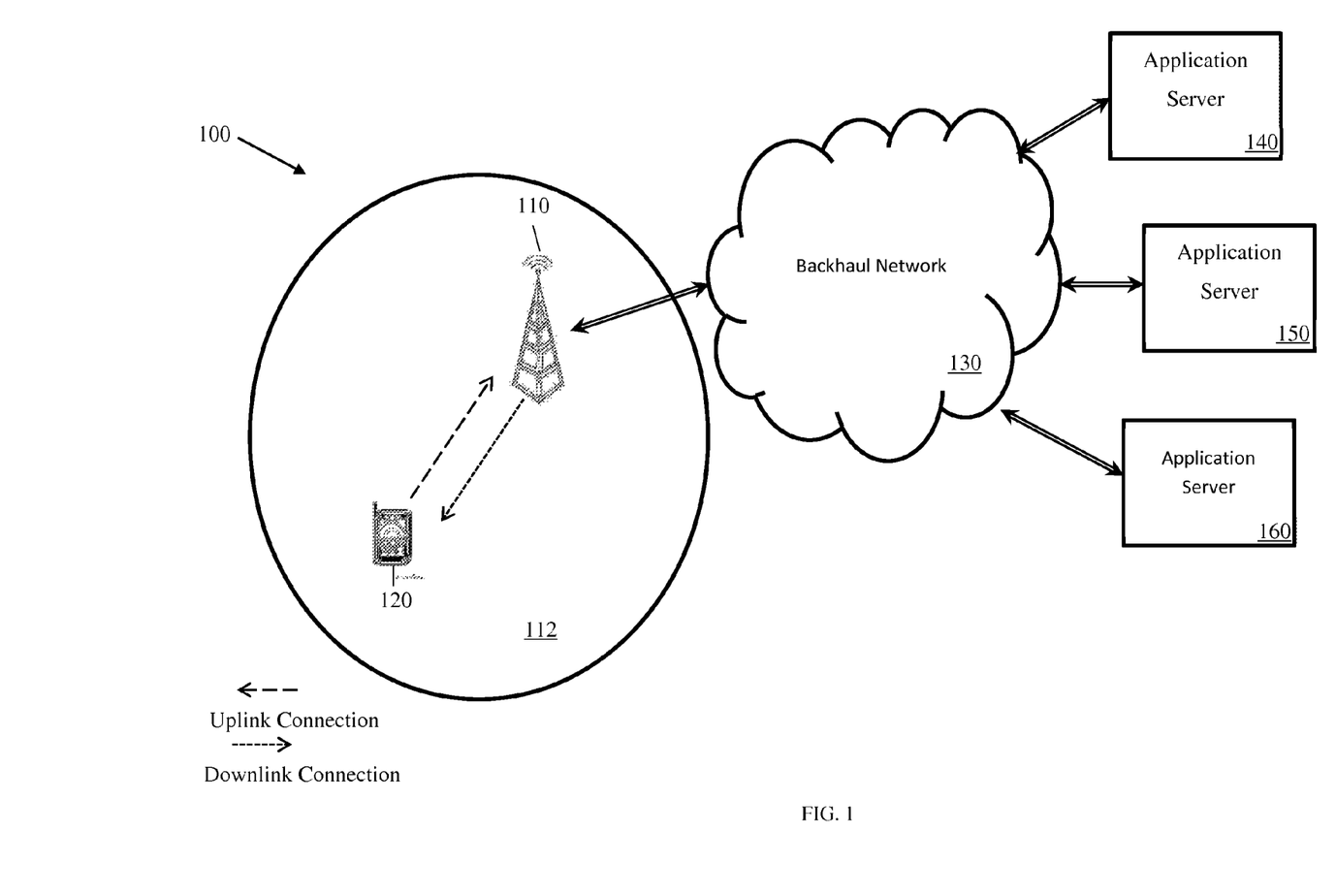
FIG. 1 illustrates an embodiment of a communications network.

FIG. 1 illustrates a communications network 100 in which various aspects of this disclosure may be implemented to conserve bandwidth over a wireless link. The network 100 comprises a base station (eNB) 110 having a coverage area 112, a user entity (UE) 120, a backhaul network 130, and a plurality of application servers 140-160. The eNB 110 may be any component capable of establishing wireless communication with the UE 120. In some embodiments, the wireless communication may be propagated over a cellular link, such as an uplink connection (dashed line) and/or a downlink connection (dotted line). In other embodiments, the wireless communication may be propagated over other types of wireless link connections (e.g., Wireless local area networks (WLAN/Wi-Fi), Bluetooth, etc.). The UE 120 may be any component or collection of components that allows a user to establish a wireless connection for purposes of accessing a network, e.g., the backhaul network 130.

The UE 120 may allow a user to run one or more data applications (e.g., internet browser, social media applications, etc.). Some of these data applications may be services that are supported (at least in part) by the applications servers 140-160. For instance, the UE 120 may be running a first data application (e.g., Internet Explorer) that corresponds to the application server 140, a second data application (e.g., Skype) that corresponds to the application server 150, and a third data application (e.g., Outlook) that corresponds to the application server 160. When the user is actively using said applications, the UE 120 may exchange service-related data with the Application servers 140-160 via the eNB 110 and the Backhaul network 130. Service-related data may include information related to internet content (e.g., webpages, etc.), streaming media (e.g., video/voice, etc.), and written correspondence (e.g., emails, etc.), and other services provided by the Application servers 140-160 via data applications.

In addition to service-related data, various background information related to the data applications may be communicated between the UE 120 and the applications servers 140-160. Background information may include predictable and/or predictable messaging that is communicated (as a matter of course) between the UE 120 and the application servers 140-160. For instance, a control packet (e.g., a hello packet) related to the third application (e.g., Outlook) may be periodically communicated from the UE 120 to the application server 140 to verify that the third application is still running on the UE 120. This type of background signaling may be predictable because of its periodic (or semi-periodic) nature, as well as due to the standard format of the message itself. In addition, non-periodic background information may be predictable due to its context. For instance, if a first application running on the UE 120 sends a goodbye message, the application server 140 may be expected to respond with its own goodbye message. Likewise, if the application server 160 sends an HyperText Markup Language (HTML) identifying a webpage to the UE 120, then the UE 120 (or a program running thereon) is likely to respond with a series of GET messages for retrieving various images/objects corresponding to that webpage, and/or equivalently utilizing significant time/frequency resources.

Depending on the number and type of applications running on the UE 120, a considerable amount of background information may be communicated over the wireless link, thereby undesirably consuming significant amounts of network bandwidth. Additionally, the UE 120 may be required to perform synchronization/initialization protocol operations with the eNB 120 prior to sending/receiving the background data. Specifically, the communication of these predictable packets (e.g., IP packets) may be performed through high layer signaling, which may require relatively high degrees of synchronization between the UE 120 and the eNB 110. Consequently, the UE 120 may need to transition from a low synchronization state (e.g., idle mode) to a high synchronization state (e.g., an active mode) before transmitting the predictable messaging, which may entail an initialization/authorization procedure (e.g., an RRC connection establishment protocol) that includes communicating hundreds of bytes of information of the wireless link.

Figure 2A:
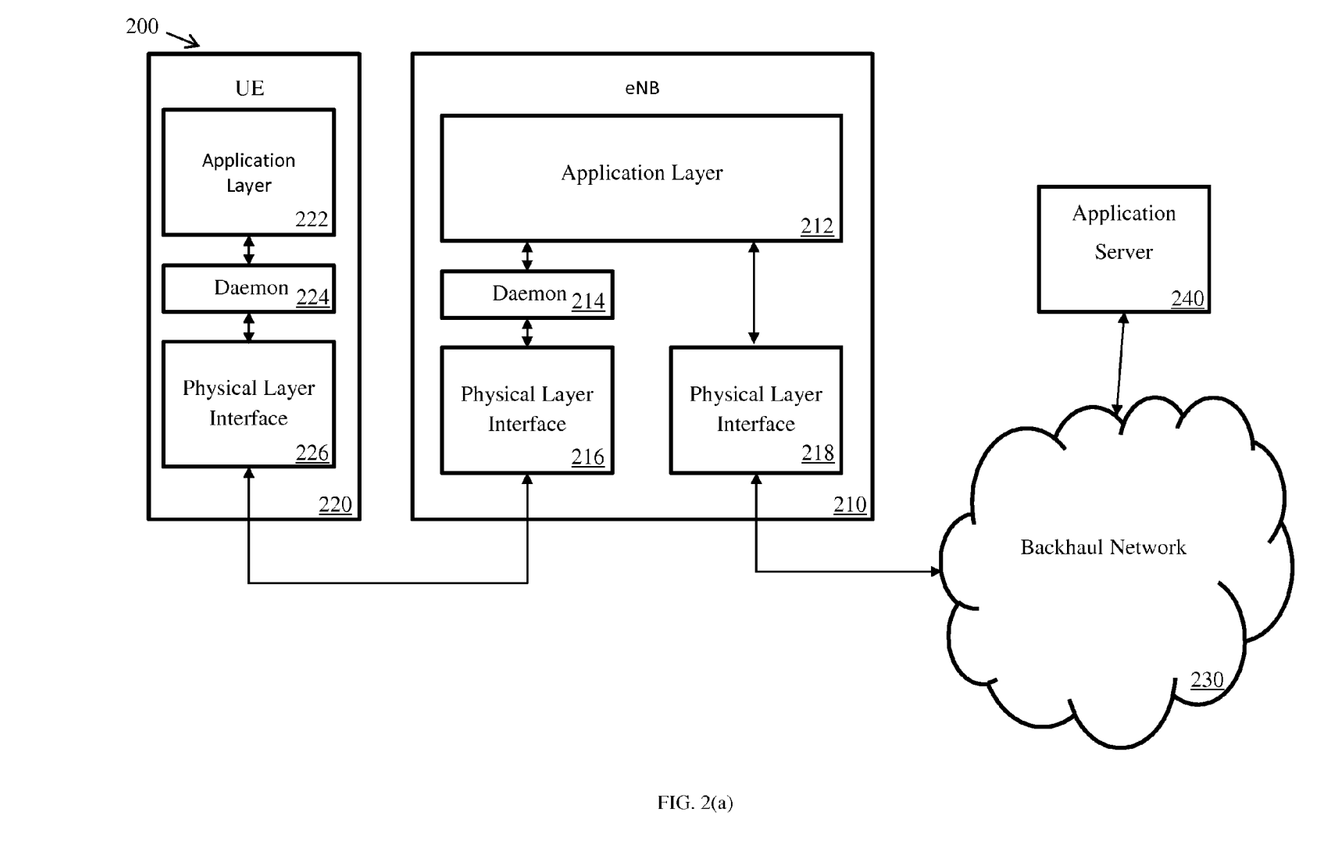
FIG. 2(a) illustrates a block diagram of an embodiment of a wireless connection formed between a UE and a base station (enhanced Node B (eNB))

FIG. 2(a) illustrates a network 200 for performing wireless communication, including the compression of high level signaling (e.g., containing background information) into low-level signaling. The network 200 comprises an eNB 210, a UE 220, a backhaul network 230, and an application server 240, which may be configured somewhat similarly to corresponding components in the network 100. The eNB 210 may comprise an application layer 212, a daemon 214, and one or more physical layer interfaces 216-218, while the UE 220 may comprise an application layer 222, a daemon 224, and a physical layer interface 226. The application layer 212 may be any component (e.g., software, hardware, or combinations thereof) that supports base station operation in the eNB 210, while the application layer 222 may be any component (e.g., software, hardware, or combinations thereof) that supports mobile device operation in the UE 220. In some embodiments, the application layer 212 and/or the application layer 222 may operate according to various application layer and/or open systems interconnection (OSI) layer 7 protocols, such as Dynamic Host Configuration Protocol (DHCP), Domain Name System (DNS), Hypertext Transfer Protocol (HTTP), Session Initiation Protocol (SIP), etc. In other embodiments, the application layer 212/222 may include various other functionality, such as the ability to perform transport layer protocol functions (e.g., Transmission Control Protocol (TCP)), and/or network layer protocol functions (e.g., IP related functions, etc.). In embodiments, the application layer 122 may allow performance of a specific task, and may be contrasted with, for example, system-software and/or middleware (e.g., operating system (OS), etc.) which provide essential services and/or resources to the application layer 122.

The daemon 214 and the daemon 224 may be any components (e.g., software, hardware, or combinations thereof) that are capable of identifying, intercepting, and/or compressing packets containing background information (predictable/predictable control data). The physical layer interface 216 and physical layer interface 226 may be any components that are capable of communicating with one another via physical layer or link layer signaling. The physical layer interface 218 may be any component that is capable of communicating with the application server 240 via the backhaul network 230. In some embodiments, the physical layer interface 216 and 218 may be configured to communicate via different protocols, as well as via different mediums. For instance, the physical layer interface 216 may be configured to communicate via a wireless connection (e.g., a cellular link, a WI-FI link, etc.), while the physical layer interface 218 may be configured to communicate via wire-line connection (e.g., optical link, twisted pair copper link, etc.).

Figure 2B:
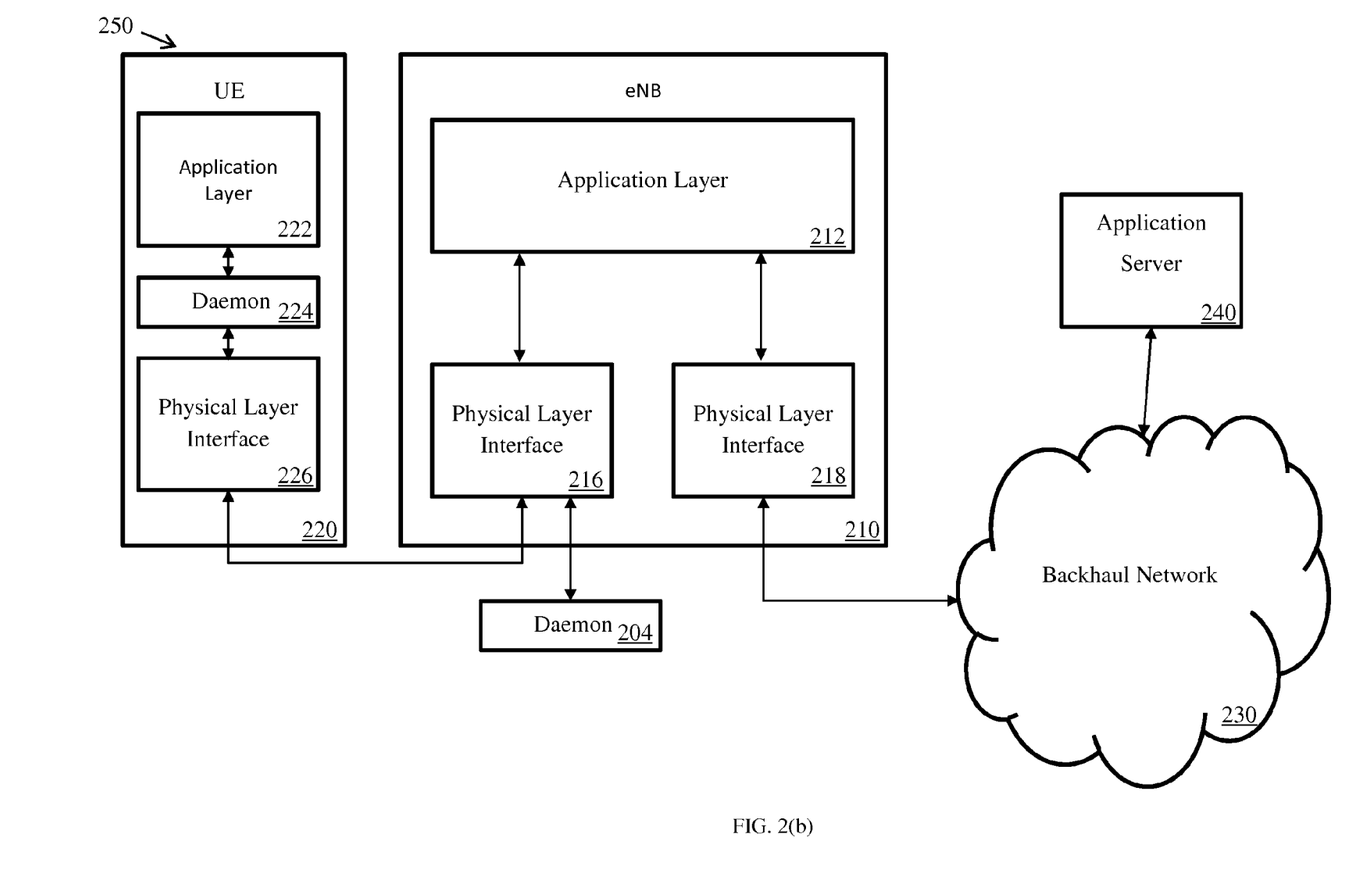
FIG. 2(b) illustrates a block diagram of another embodiment of a wireless connection formed between a UE and a base station (eNB)

In some embodiments, the daemon may reside outside of the eNB 210. FIG. 2(b) illustrates a network 250 for performing wireless communication, including the compression of high level signaling (e.g., containing background information) into low-level signaling. The network 250 is similar to the network 200, but includes a daemon 204 that resides outside the eNB 210. Although much of this disclosure is discussed in the context of the network 200, it should be understood that aspects of this disclosure may be applied to the network 250. For instance, the daemon 204 may intercept signaling (e.g., high-layer signaling), as well as replicate (or trigger the replication of) a predictable data packet.

Figure 3:
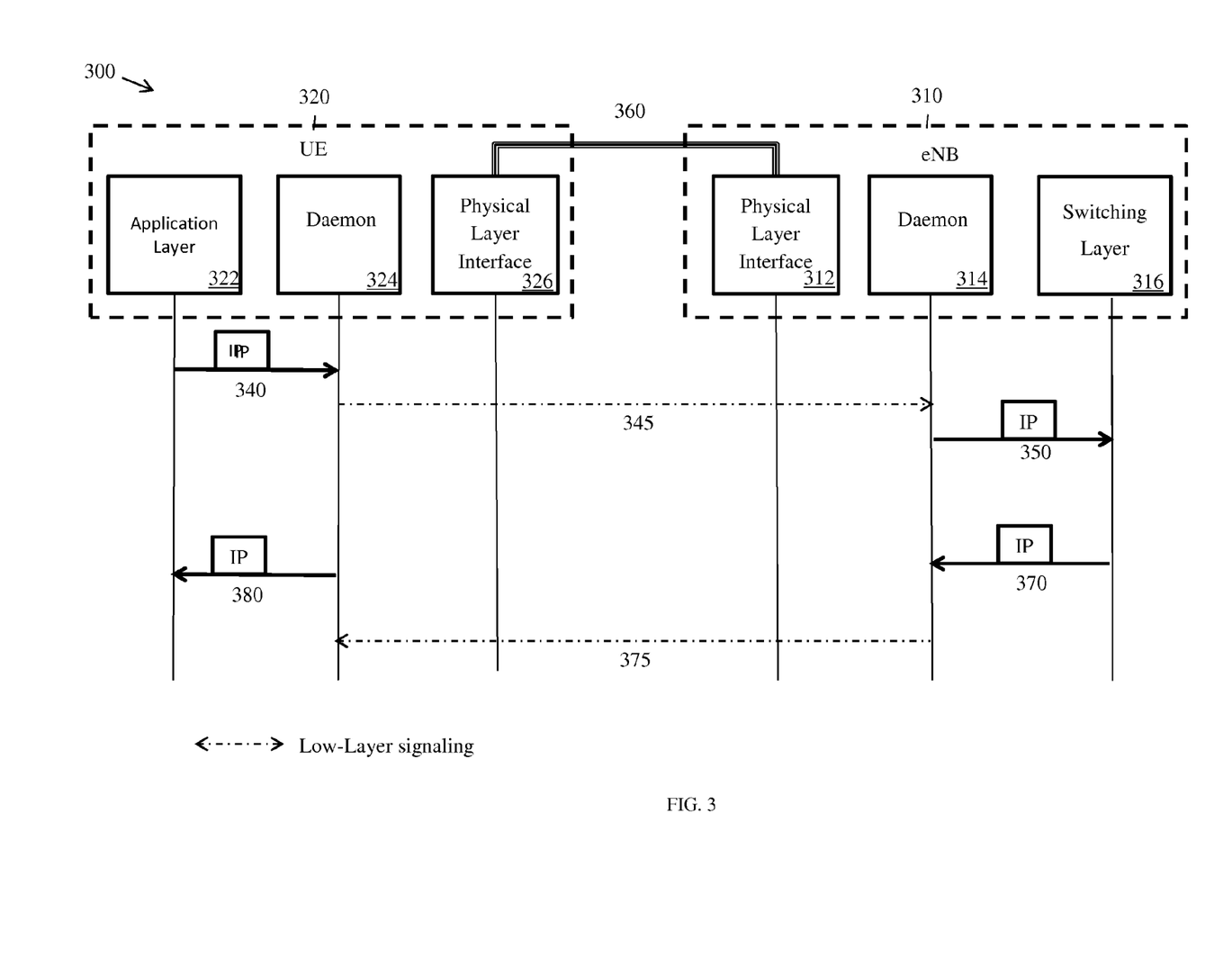
FIG. 3 illustrates a protocol diagram of an embodiment of a signaling sequence between a UE and an eNB.

FIG. 3 illustrates a protocol diagram of a signaling sequence 300 for compressing high level predictable packets into lower layer signaling. The signaling sequence 300 is performed by the eNB 310 and the UE 320, which may be configured similarly to the eNB 210 and the UE 220 in the network 200 and/or the eNB 110 and the UE 120 in the network 100. Specifically, the application layer 322 (or an application running thereon) generates a predictable packet 340 (e.g., an internet protocol (IP) packet) for communication to a destination on the other side of the wireless link, e.g., the eNB 310, an application server (not shown) connected to the eNB 320 via a backhaul network (not shown), etc. The application layer 322 sends the predictable packet 340 towards the physical layer 326. However, before reaching the physical layer 326, the packet 340 is intercepted by the daemon 324, where the packet is suppressed (i.e., prevented from by processed by the physical layer 326). The daemon 324 classifies the predictable packet 340 to identify its type, and sets/clears an appropriate signaling indicator 345. In embodiments, the signaling indicator 345 may be low-layer signaling that is capable of being transmitted/received while the UE 320 is operating in a low synchronization state, such as an idle state or low-active state. For instance, the signaling indicator 345 may be a specific time-frequency resource in a low-level control channel, e.g., an on-off keying (OOK) channel, such as that used in many random access channels (RACH).

By intercepting the packet 340 and setting the appropriate signaling indicator 345, the daemon 324 effectively compresses high layer signaling (as would have been required to communicate the predictable packet) into low layer signaling. The signaling indicator 345 is sent to the physical layer 326 for transportation over the wireless link 360 to the eNB 310. The eNB 310 receives the signaling indicator 345 via the physical layer interface 312, where the signaling indicator 345 is detected by the daemon 314. The daemon 314 recognizes that the signaling indicator 345 corresponds to a certain type of predictable packet (i.e., the type identified during the daemon's 324 classification of the packet 340), and thereafter replicates the predictable packet 350. The replicated predictable packet 350 is forwarded to the application layer 316, from which it is transported to the intended destination (e.g., an application server) over a network or medium (e.g., over a backhaul network). In some embodiments, the signaling indicator 345 may be carried in a low-layer control channel that is established after the predictable packet 340 is intercepted by the daemon 324. In other embodiments, the low-layer control channel may be pre-established, e.g., existing before the predictable packet 340 is intercepted.

A similar process occurs when a predictable packet 370 is sent from the eNB 310 to the UE 320. Specifically, the daemon 314 intercepts and classifies the predictable packet 370, thereby compressing it into an appropriate low-level signaling indicator 375. The signaling indicator 375 is transported over the wireless link 360, where it is detected by the daemon 324, and de-compressed into the replicated predictable packet 380.

An illustrative example of implementing aspects of this disclosure in a random access channel of an LTE wireless network standard is included herein to demonstrate how said aspects of this disclosure may be implemented in similar channels of other networks (including LTE and non-LTE networks alike). In LTE, a RACH signal is generated by the physical layer interface 326 of UE 320 in network 300. Using various parameters such as those defined in PRACH-Config information element and well as other information elements, the UE can generate the RACH signal. The PRACH-Config information element is described in 3GPP technical specification (TS) 36.331 release 10 version 10.5.0 (March-2012) of the LTE standard, which is incorporated herein by reference as if reproduced in its entirety. Typically, a UE can select a "shift value" (e.g. for an initial access) or be assigned a shift value (e.g., for a handoff) from a range of shift values. The shift value is related to RACH signal generation. In this example, a UE can be assigned a shift value for each application. For a first application, the daemon 324 converts the message 340 into a RACH signal with a first specific shift value. For a second application, the daemon 324 converts the message 340 into a RACH signal with a second specific shift value. At the eNB 310, the daemon 314 can associate the shift value from signaling indicator 345 (i.e., RACH signal) to generate the replicated predictable packet 350. If the daemon 314 observes the first specific shift value, the daemon 314 will generate the replicated predictable packet 350 for the first application. Note that during establishment of the wireless link 360, there may a procedure to associate the shift values of the RACH signal to applications so that the daemon 324 can determine the correct shift value as well as daemon 314 that can map the detected shift value into a replicated predictable packet 350. This procedure may involve using high layer messaging.

An example of signaling indicator 375 is presented for LTE. Daemon 314 may receive a predicable packet 370 for an application 322. The eNB 310 may elect to aggregate one or more signaling indicators 375 to reduce overhead. The eNB 310 may send the aggregated signaling indicators 375 over wireless link 360 using a paging channel. For example, a UE periodically examines to see whether it was paged. The eNB may elect to send the aggregated signaling indicators 375 during that paging channel. At the UE 320, daemon 324 associates the received signaling indicators 375 into the replicated predictable packets 380 for the application layer 322.

Figure 4:
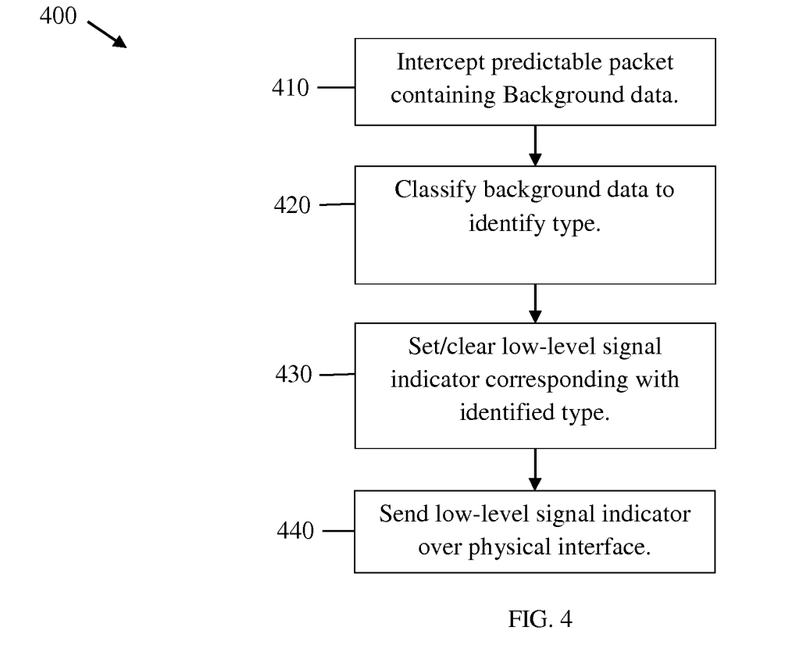
FIG. 4 illustrates a flowchart of a method for compressing high level predictable messaging into low level signaling.

FIG. 4 illustrates a method 400 for compressing high level predictable messaging into low level signaling. The method 400 begins at step 410, where a transmitter side daemon intercepts a predictable packet containing background data. The method 400 then proceeds to step 420, where the transmitter side daemon classifies the background data contained within the predictable packet to identify its type. Next, the method 400 proceeds to step 430, where the transmitter side daemon sets/clears a low-level (or low-layer) signaling indicator that corresponds to the identified type. Finally, the method 400 proceeds to step 440, where the low-level singling indicator is sent over the physical interface.

Figure 5:
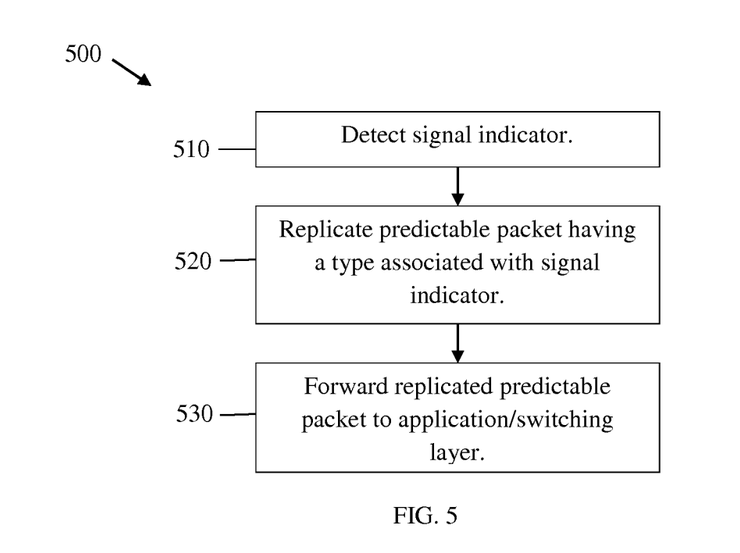
FIG. 5 illustrates a flowchart of a method for de-compressing low level signaling to replicate high-level predictable messaging.

FIG. 5 illustrates a method 500 for de-compressing low level signaling to replicate high-level predictable messaging. The method 500 begins at step 510, where a receiver side daemon detects a low-level signaling indicator. The method 500 proceeds to step 520, where the receiver side daemon creates or generates a replica of a predictable packet having a type that is associated with the detected low-level signaling indicator. Finally, the method 500 proceeds to step 530, where the receiver side daemon forwards the replicated predictable packet to an appropriate destination (e.g., an application server or an application).

Although aspects of this disclosure are discussed in the context of low-layer signaling, it should be understood that such aspects may be adapted to high-layer signaling as well. For instance, a high-layer predictable message may be compressed into high-layer signaling (e.g., high-layer indicators), instead of low-layer signaling.

Figure 6:
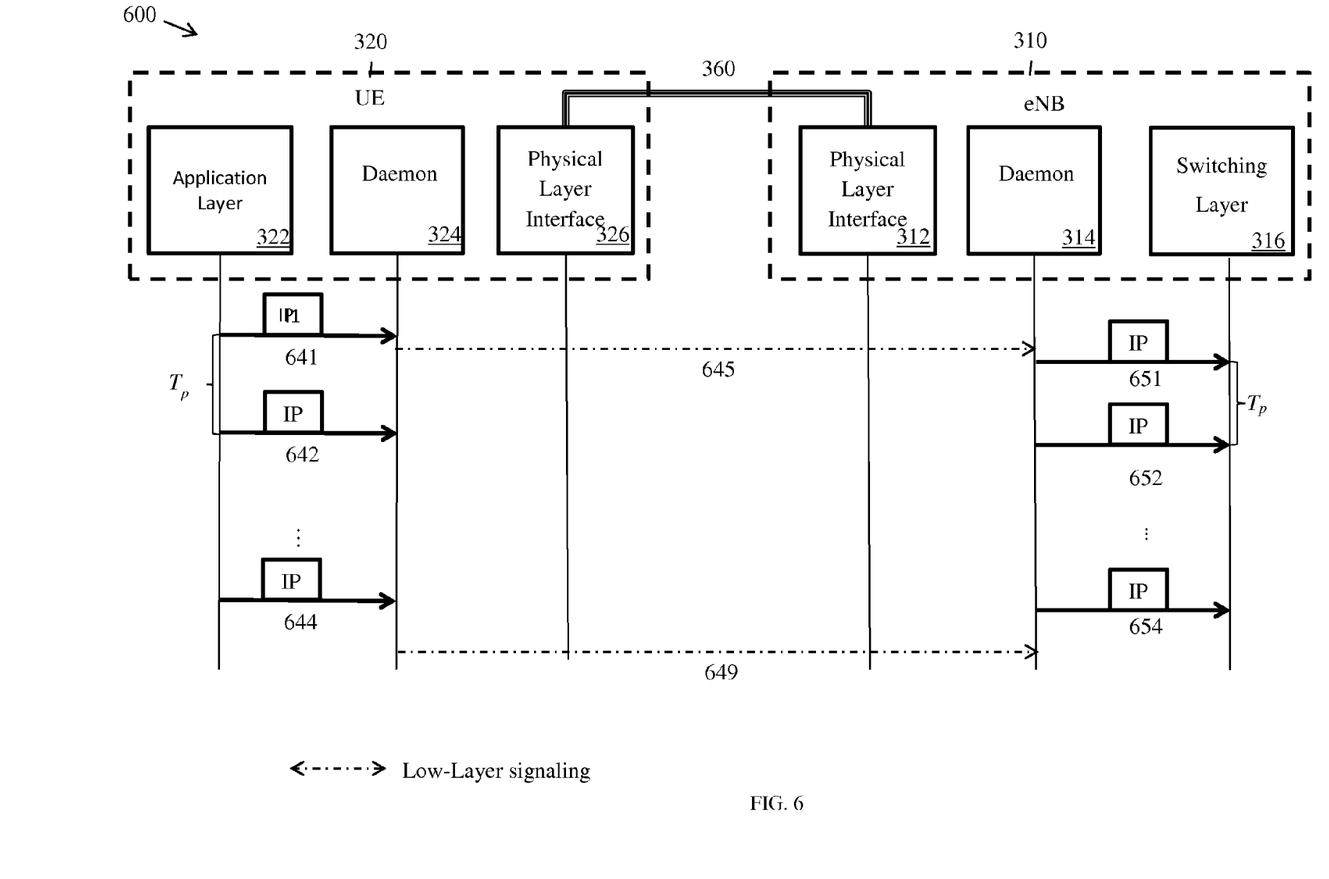
FIG. 6 illustrates a protocol diagram of another embodiment of a signaling sequence between a UE and an eNB.

FIG. 6. Illustrates a protocol diagram of a signaling sequence 600 between the UE 320 and an eNB 310 for suppressing periodic signaling. To begin the sequence 600, the daemon 324 detects an instance of a periodic signaling 641, and transmits a signaling message 645 to the daemon 314. In an embodiment, the signaling message 645 may be a start/stop message that instructs the daemon 314 to replicate the periodic signaling 641-644 (thereby producing replicated packets 651-654) at projected intervals corresponding to a time period ($T_p$) of the periodic signaling 641-644. The daemon 314 may continue to replicate the periodic signaling 652-654 without receiving further signaling from the daemon 324. At some point the daemon 324 may detect cessation of the periodic signaling 641-644, and send a message 649 instructing the daemon 314 to stop producing the replicated packets 652-654.

From a general perspective, applications running in UE 320 may register with daemon 324. As part of the registration, each application may provide a time period of the periodic signaling 641-644 to daemon 324. During a set-up procedure, daemon 314 may be provided with similar information as given to daemon 324. When signaling message 645 is received by daemon 314, based on the parameters provided during the set-up period, daemon 314 can generate the replicated periodic signaling 652-654. Some examples of the parameters are address, periodicity, counter update values, message format/content and time-out values.

Figure 7:
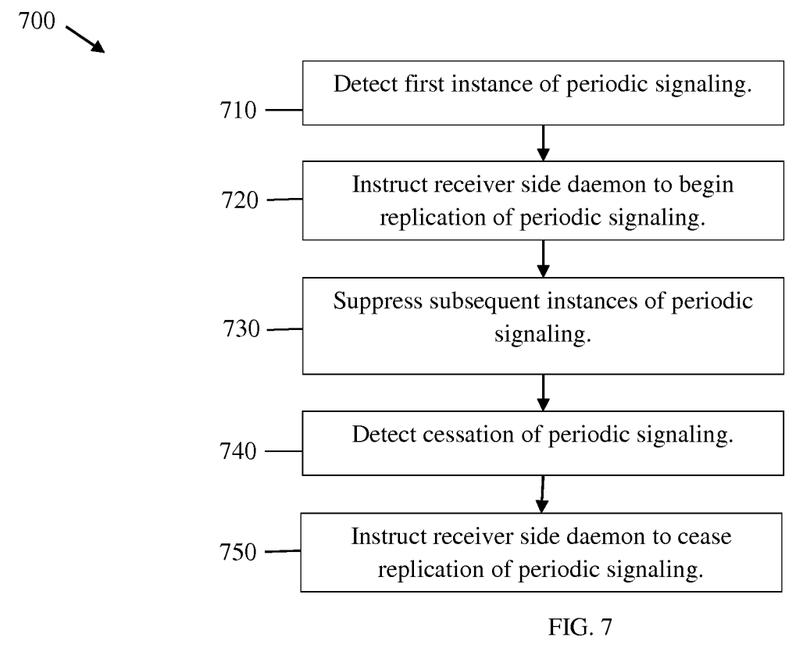
FIG. 7 illustrates a flowchart of an embodiment of a method for suppressing periodic signaling.

FIG. 7. Illustrates a method 700 for suppressing periodic signaling on the transmitter side. The method 700 begins at step 710, where a transmitter side daemon detects a first instance of periodic signaling. The method 700 the proceeds to step 720, where the transmitter side daemon instructs the receiver side daemon to begin replication of the periodic signaling. Next, the method 700 proceeds to step 730, where the daemon suppress subsequent instances of the periodic signaling (e.g., without notifying the receiver side daemon of said instances of periodic signaling). After some time, the method 700 proceeds to step 740, where the transmitter side daemon detects a cessation of periodic signaling. In some embodiments, said detection may occur when the transmitter side daemon does not observe an instance of the periodic signaling during a time-out period. In other embodiments, said detection may occur when the daemon observes an application layer protocol message indicating that the periodic signaling has ended. Next, the method 700 proceeds to step 750, where the transmitter side daemon instructs the receiver daemon to cease replication of the periodic signaling.

Figure 8:
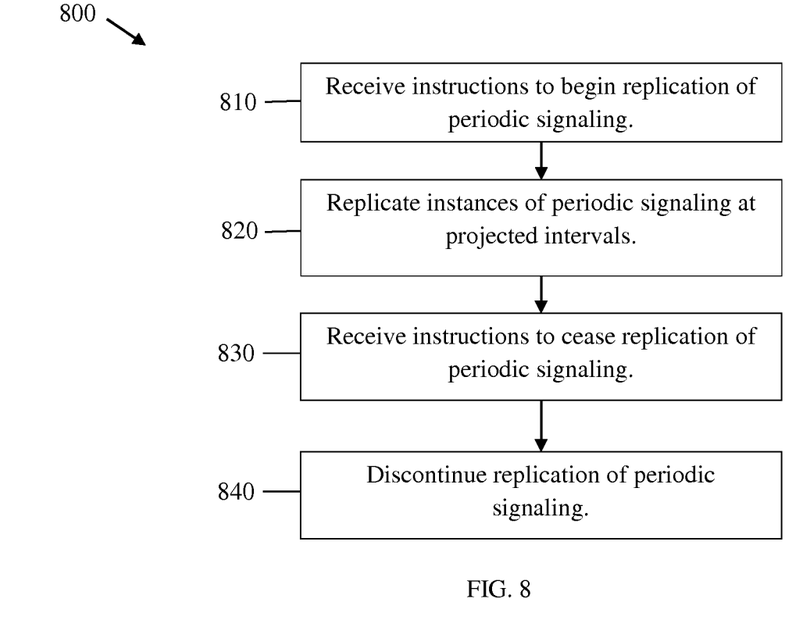
FIG. 8 illustrates a flowchart of an embodiment of a method for replicating instances of suppressed periodic signaling.

FIG. 8. Illustrates a method 800 for replicating suppressed periodic signaling on the receiver side. The method 800 begins at step 810, where the receiver side daemon receives an instruction to begin replication of the periodic signaling. Next, the method 800 proceeds to step 820, where the receiver side daemon replicates suppressed instances of periodic signaling at projected intervals. Subsequently, the method 800 proceeds to step 830, where the receiver side daemon receives an instruction to stop replicating the periodic signaling. Finally, the method 800 proceeds to step 840, where the receiver side daemon stops replicating the periodic signaling.

In some implementations, background data carried in non-periodic messages may be predictable in context. For instance, a device may be expected to return a reply message (of a certain type) upon receiving a request message (of a certain type). In other words, an initial message (e.g., a triggering message) may predictably elicit one or more responses (e.g., triggered messages). In one example, a second device receiving a goodbye message from a first device may be expected to respond with its own goodbye message. In another example, a UE that receives an HTML message (e.g., identifying a webpage) from an application server may be expected to respond with a series of GET messages for retrieving various images/objects corresponding to that webpage. Daemons (or similar applications) can exploit such predictable situations by predicting the triggered messages and/or establishing a low-layer control channel ahead of time (e.g., when detecting the triggering messages), so that the triggered messages may be communicated using less bandwidth (e.g., using low-level signaling transported over the low-layer control channel, rather than high-level IP messages transported over a high-layer channel).

Figure 9:
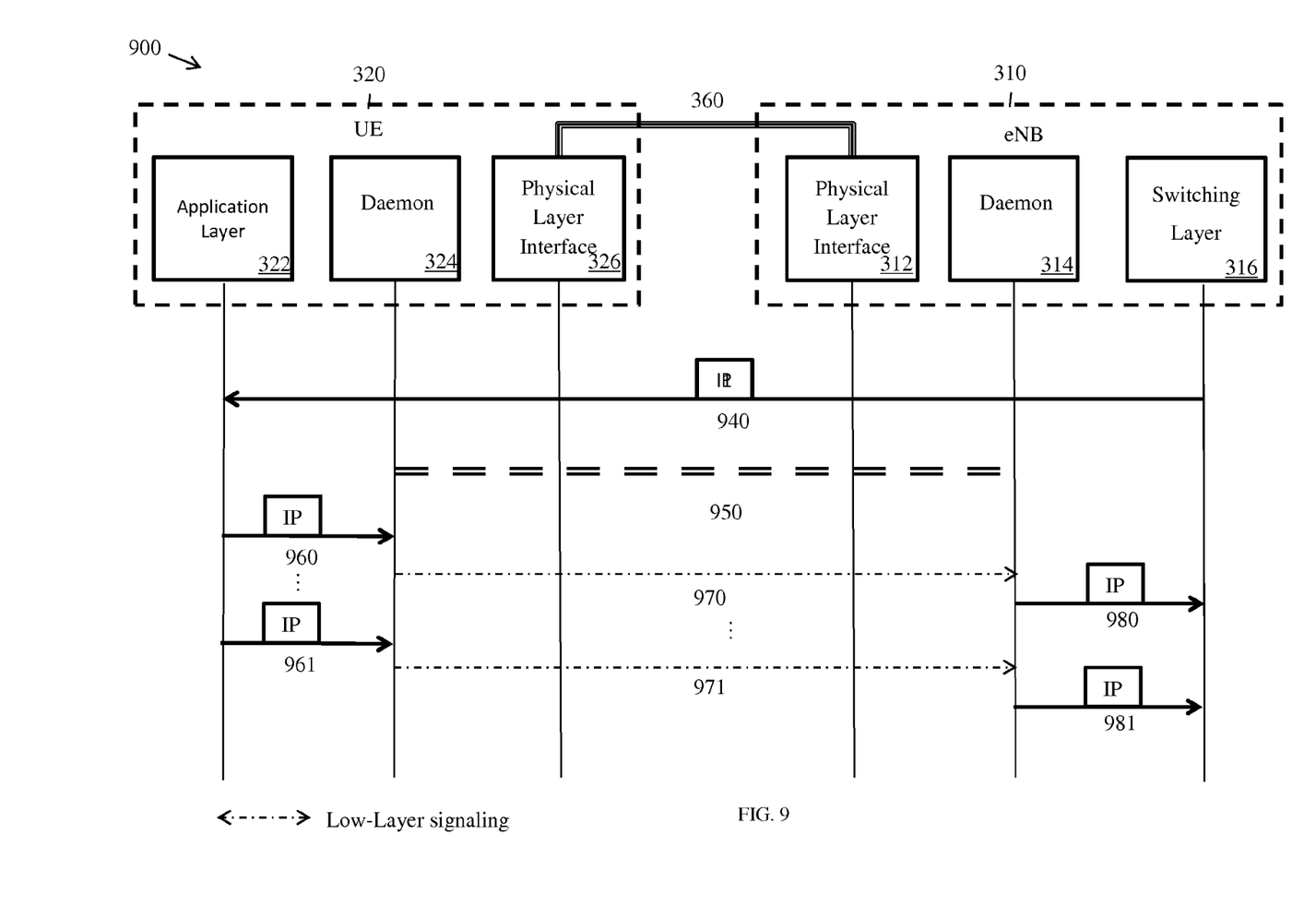
FIG. 9 illustrates a protocol diagram of another embodiment of a signaling sequence between a UE and an eNB.

FIG. 9. Illustrates a protocol diagram of a signaling sequence 900 for suppressing background data that is predictable in context. The signaling sequence 900 begins with the detection of a triggering message 940 (e.g., an HTML of a webpage) by either one of the daemons 314 and 324. The triggering message 940 may be any predictably lead to the communication of one or more (e.g., a sequence) of triggered messages. In one example, the triggering message is an HTML message (HTTP packet) sent by the application server. However, in practice, the triggering message may be any message that would predictably lead to the communication of one or more of triggered messages. Said detection of the triggering message may cause the daemons 314, 324 to establish a low-layer channel 950, for communicating the anticipated triggered messages 960-961. Next, the daemon 324 may detect the triggered messages 960-961 (e.g., GET messages for retrieving objects of the webpage), and subsequently compress the triggering messages 960-961 into low-layer signaling 970-971. The low-layer signaling may be communicated to the daemon 314, who may replicate the triggered messages 960-961 (thereby creating replicated triggered messages 980-981).

Figure 10:
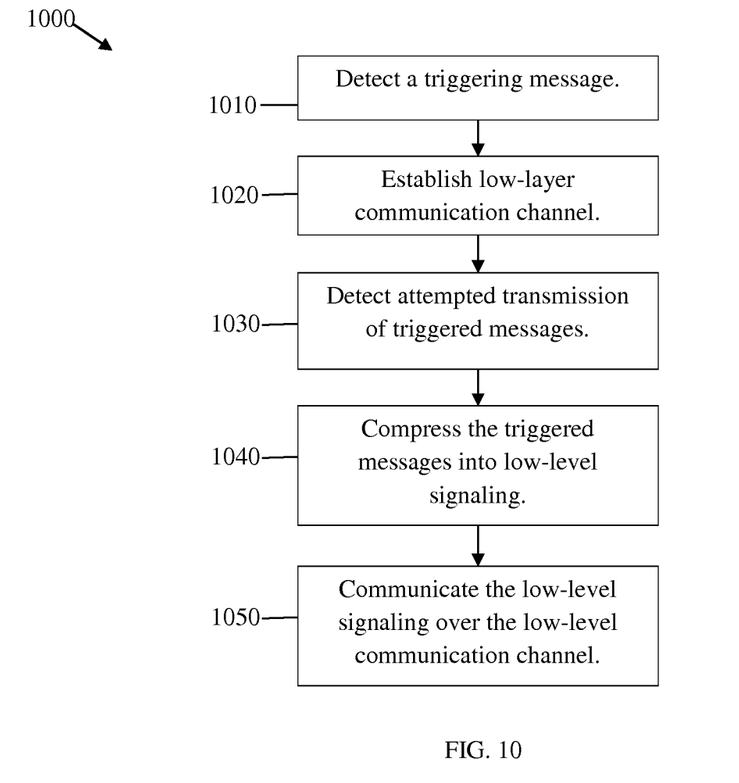
FIG. 10 illustrates a flowchart of a method for compressing background data that is predictable in context.

FIG. 10 illustrates a method 1000 for compressing high level signaling that is predictable in context. The method 1000 may begin at step 1010, where a daemon positioned on one side of a wireless link detects a triggering message. Either the daemon on the receiver side or the daemon on the transmitter side may detect the triggering message. In some instances, the triggering message may be an application layer packet, while in other instances the triggering message may be a low level signaling indicator (e.g., corresponding to a compressed application layer packet).

Next, the method 1000 proceeds to step 1020, where a low-layer signaling channel is established for communication of the triggered messages. Parameters of the low-layer signaling channel may be pre-established (i.e., agreed upon beforehand) or dynamically negotiated. Next, the method 1000 may proceed to step 1030, where the triggered messages are detected by a daemon. The method 1000 may then proceed to step 1040, where the daemon may compress the triggered messages into low-level signaling. Finally, the method 1000 may proceed to the step 1050, where the low-level signaling may be communicated over the low-layer singing channel. Notably, a method similar to that described in FIG. 5 may be implemented to decompress the low-level indicator for the purposes of replicating the triggered messages. Optionally, if the triggered messages are predicted with errors (e.g., one or more sub parameters are incorrectly guessed), then the original triggered message may be sent normally (e.g., instead of the low-layer singling).

Aspects of this disclosure may be applicable to various protocols, including (but not limited to) HTML protocol, transmission control protocol (TCP), Session Initiation Protocol (SIP), etc.

Figure 11:
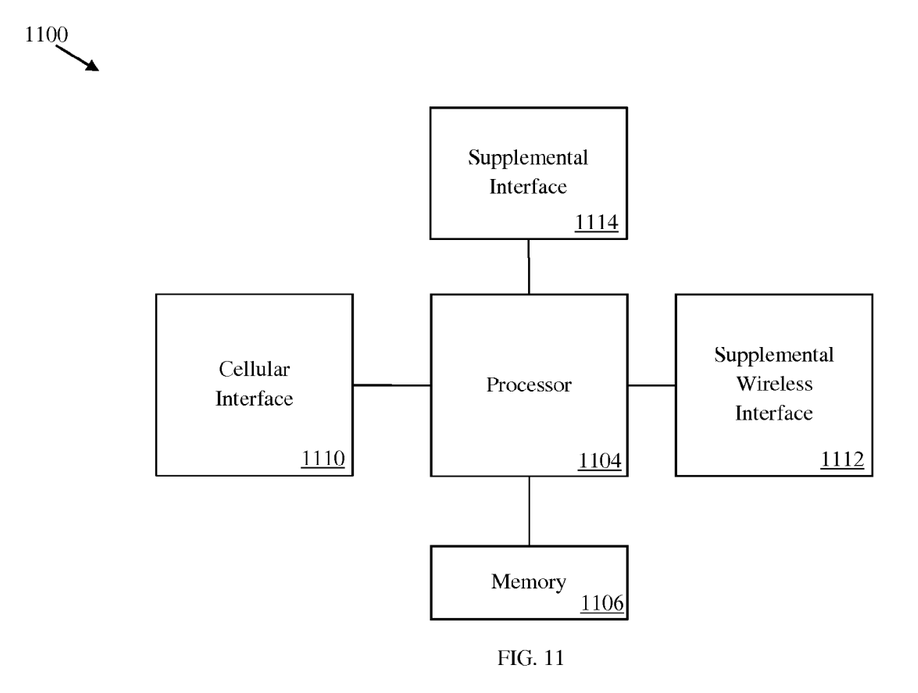
FIG. 11 illustrates a block diagram of an embodiment communications device.

FIG. 11 illustrates a block diagram of an embodiment of a communications device 1100, which may be equivalent to one or more devices (e.g., UEs, eNBs, etc.) discussed above. The communications device 1100 may include a processor 1104, a memory 1106, a cellular interface 1110, a supplemental wireless interface 1112, and a supplemental interface 1114, which may (or may not) be arranged as shown in FIG. 11. The processor 1104 may be any component capable of performing computations and/or other processing related tasks, and the memory 1106 may be any component capable of storing programming and/or instructions for the processor 1104. The cellular interface 1110 may be any component or collection of components that allows the communications device 1100 to communicate using a cellular signal, and may be used to receive and/or transmit information over a cellular connection of a cellular network. The supplemental wireless interface 1112 may be any component or collection of components that allows the communications device 1100 to communicate via a non-cellular wireless protocol, such as a Wi-Fi or Bluetooth protocol, or a control protocol. The supplemental interface 1114 may be component or collection of components that allows the communications device 1100 to communicate via a supplemental protocol, including wire-line protocols.

Although the present invention and its advantages have been described in detail, it should be understood that various changes, substitutions and alterations can be made herein without departing from the spirit and scope of the invention as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for compressing background data that is predictable in context, the method comprising:
    detecting, by a device, a triggering message carrying the background data that is predictable in context, wherein the triggering message is configured to prompt transmission one or more triggered messages over a high-layer channel of a link;
    establishing, or verifying the existence of, a low-layer channel on the link; and
    communicating one or more low-layer signaling indications from a transmitter-side of the link to a receiver-side of the link, wherein the one or more low-layer signaling indications correspond to compressed versions of the one or more triggered messages, and wherein the one or more low-layer signaling indications prevent the transmission of the one or more triggered messages over the high-layer channel.

2. The method of claim 1, wherein the link is a wireless link.

3. The method of claim 1, wherein the triggering message is an application layer protocol packet that is intercepted prior to physical layer processing on the transmitter-side of the link.

4. The method of claim 1, wherein the triggering message is an application layer protocol packet that is intercepted prior to physical layer processing on the receiver-side of the link.

5. The method of claim 1, wherein the triggering message is a physical layer packet that is intercepted prior to application layer processing on the transmitter-side of the link.

6. The method of claim 5, wherein detecting the triggering message carrying the background data that is predictable in context comprises:
intercepting the triggering message prior to application layer processing on the transmitter-side of the link.

7. The method of claim 6, further comprising:
discarding the triggering message without performing application layer processing, thereby preventing generation of the one or more triggered messages on the transmitter-side of the link.

8. The method of claim 1, wherein a communication over the high-layer channel requires a higher degree of synchronization than that required by a communication over the low-layer channel.

9. The method of claim 1, wherein the device is positioned on the transmitter-side of the link.

10. The method of claim 1, wherein the device is positioned on the receiver-side of the link.

11. The method of claim 1, wherein the triggered messages comprise physical layer acknowledgment messages, and wherein the one or more low-layer signaling indications comprise transport communication protocol (TCP) acknowledgment messages.

12. An apparatus for compressing background data that is predictable in context, the apparatus comprising:
a physical layer interface for establishing a link with a communications device;
a processor; and
a computer readable storage medium storing programming for execution by the processor, the programming including instructions to:
detect a triggering message carrying the background data that is predictable in context, wherein the triggering message is configured to prompt transmission one or more triggered messages over a high-layer channel of a link;
establish, or verify the existence of, a low-layer channel on the link; and
communicate one or more low-layer signaling indications from a transmitter-side of the link to a receiver-side of the link, wherein the one or more low-layer signaling indications correspond to compressed versions of the one or more triggered messages, and wherein the one or more low-layer signaling indications prevent the transmission of the one or more triggered messages over the high-layer channel.

13. The apparatus of claim 12, wherein the link is a wireless link.

14. The apparatus of claim 12, wherein the triggering message is an application layer protocol packet that is intercepted prior to physical layer processing on the transmitter-side of the link.

15. The apparatus of claim 12, wherein the triggering message is an application layer protocol packet that is intercepted prior to physical layer processing on the receiver-side of the link.

16. The apparatus of claim 12, wherein the triggering message is a physical layer packet that is intercepted prior to application layer processing on the transmitter-side of the link.

17. The apparatus of claim 16, wherein the instruction to detect the triggering message carrying the background data that is predictable in context include instructions to:
intercept the triggering message prior to application layer processing on the transmitter-side of the link.

18. The apparatus of claim 12, wherein the programming further includes instructions to:
discard the triggering message without performing application layer processing, thereby preventing generation of the one or more triggered messages on the transmitter-side of the link.

19. The apparatus of claim 12, wherein a communication over the high-layer channel requires a higher degree of synchronization than that required by a communication over the low-layer channel.

20. The apparatus of claim 12, wherein the apparatus is a device positioned on transmitter-side of the link.

21. The apparatus of claim 12, wherein the apparatus is a device positioned on the receiver-side of the link.

22. The apparatus of claim 12, wherein the triggered messages comprise physical layer acknowledgment messages, and wherein the one or more low-layer signaling indications comprise transport communication protocol (TCP) acknowledgment messages.

* * * * *